US009602863B2

United States Patent
Lechner et al.

(10) Patent No.: US 9,602,863 B2
(45) Date of Patent: Mar. 21, 2017

(54) AD REPLACEMENT

(75) Inventors: Marcelo D. Lechner, Burlington, MA (US); Michael P. Ruffini, Methuen, MA (US); Jason L. Malamud, New York, NY (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 450 days.

(21) Appl. No.: 13/397,857

(22) Filed: Feb. 16, 2012

(65) Prior Publication Data
US 2013/0219424 A1   Aug. 22, 2013

(51) Int. Cl.
*H04N 21/81* (2011.01)
*H04N 21/432* (2011.01)
*H04N 21/44* (2011.01)
*H04N 21/458* (2011.01)

(52) U.S. Cl.
CPC ... *H04N 21/4325* (2013.01); *H04N 21/44016* (2013.01); *H04N 21/4586* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 2002/0124077 A1* | 9/2002 | Hill et al. | 709/224 |
| 2002/0144262 A1* | 10/2002 | Plotnick et al. | 725/32 |
| 2003/0066078 A1* | 4/2003 | Bjorgan et al. | 725/34 |
| 2007/0101359 A1* | 5/2007 | Schiller | H04H 20/103 725/33 |
| 2008/0301750 A1* | 12/2008 | Silfvast et al. | 725/131 |
| 2009/0210899 A1* | 8/2009 | Lawrence-Apfelbaum et al. | 725/34 |
| 2010/0031162 A1* | 2/2010 | Wiser et al. | 715/747 |
| 2010/0095323 A1* | 4/2010 | Williamson et al. | 725/32 |
| 2010/0189131 A1* | 7/2010 | Branam | H04N 21/23424 370/474 |
| 2010/0242065 A1* | 9/2010 | Murakami | 725/34 |
| 2011/0072456 A1* | 3/2011 | White et al. | 725/32 |
| 2011/0219402 A1* | 9/2011 | Candelore et al. | 725/34 |
| 2013/0014159 A1* | 1/2013 | Wiser et al. | 725/34 |
| 2013/0132993 A1* | 5/2013 | Huchital et al. | 725/22 |
| 2013/0152125 A1* | 6/2013 | Xiong et al. | 725/34 |

* cited by examiner

*Primary Examiner* — Nathan Flynn
*Assistant Examiner* — Michael Telan

(57) ABSTRACT

Devices, methods, and storage media provide for receiving an airing of a program and a national ad; recording the program and the national ad; identifying an age of the national ad; comparing the age of the national ad to a threshold time period; and obtaining a replacement national ad in response to a comparison indicating that the age of the national ad exceeds the threshold time period.

20 Claims, 9 Drawing Sheets

AD REPLACEMENT

BACKGROUND

A distribution system, such as a distribution system for television programming, provides an expansive array of programs, such as movies, local programs, national programs, sports, news, etc., to users. Additionally, the distribution system provides users with a variety of advertisements (ads) (e.g., commercials, etc.).

DETAILED DESCRIPTION

Figure 1:
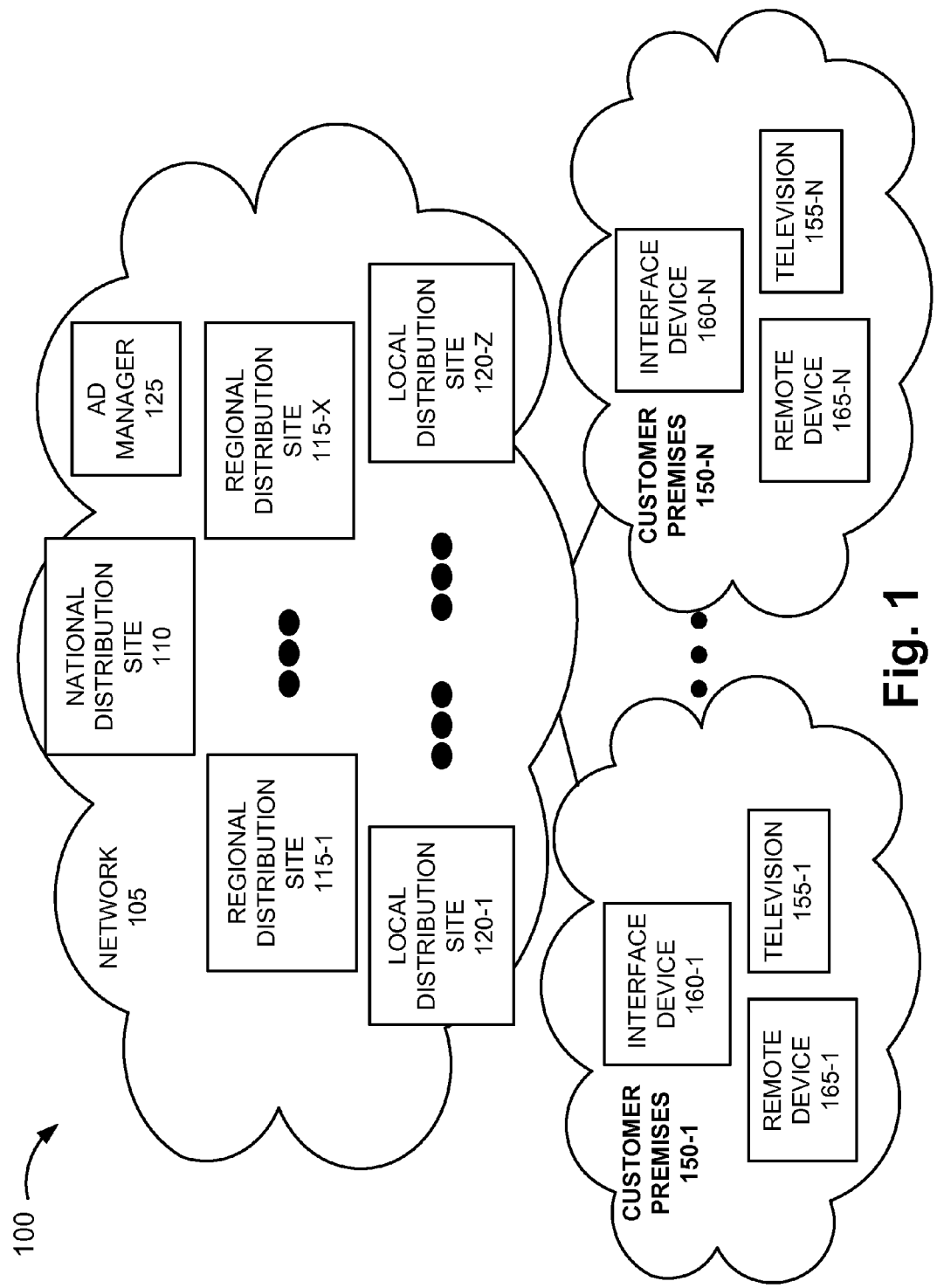
FIG. 1 is a diagram illustrating an exemplary environment in which an exemplary embodiment of ad replacement may be implemented.

The following detailed description refers to the accompanying drawings. The same reference numbers in different drawings may identify the same or similar elements.

There are three types of ad-insertion spots available for television, which are national ad-insertion spots, regional ad-insertion spots, and local ad-insertion spots. National ad-insertion spots are not sold to service providers (e.g., television service providers), while regional and local ad-insertion spots are sold or granted to service providers. Additionally, service providers are not provided with cue and timing information pertaining to national ad-insertion spots.

National ads are relevant only for a three-day period from an original air date due to the Nielson rating system. This means that the airing or playback of a national ad is billable to, for example, the national ad provider, during this three-day period. After the three-day period transpires, the national ad is no longer billable. As an example, assume that XYZ network sells a national ad-insertion spot that occurs within a particular program to RST company, which produces a soft drink. RST company purchases the national ad slot and provides a national ad to be used during the national ad-insertion spot. During a three-day period from the airing of the program and the national ad, RST company may be billed for their use of the national ad spot (e.g., when the ad is watched live and via a digital video recorder (DVR) playback). However, after the three-day period, XYZ network is unable to bill for the national ad-insertion spot. In cases when a program and national ad is recorded (e.g., by a digital video recorder (DVR)), a user may watch the recorded program and national ad after the three-day period.

The term "program" includes video and/or audio content. A program may include, for example, a local program, a national program, a television show, a movie, a sporting event, a news program, a musical event, or an audio program (e.g., a program that plays music).

The term "ad" includes video content, audio content, video and audio content, interactive elements, and/or other forms of content. An ad may include, for example, a commercial, an audio voiceover, a promotion for a program, or other type of advertisement.

While implementations of exemplary embodiments described herein are described using a particular protocol, communication standard, device, etc., such implementations of the embodiments are not intended to be restrictive nor provide an exhaustive treatment, as such. In other words, the exemplary embodiments described herein may be implemented using other suitable protocols, communication standards, devices, etc., that may not be specifically described herein.

According to an exemplary embodiment, national program providers and/or national ad providers provide cue and timing information pertaining to national ad-insertion spots to service providers (e.g., television service providers). For example, cue and timing information may be embedded into program data that indicates a national ad-insertion spot.

According to an exemplary embodiment, a receiving device is capable of receiving programs and ads from a network. According to an exemplary embodiment, the receiving device is capable of playing a recorded program and an ad (e.g., a program and an ad recorded and stored by a DVR) and identifying the presence of cue and timing information pertaining to a national ad-insertion spot. According to an exemplary embodiment, the receiving device is capable of replacing an existing ad with another ad if the playback of the existing ad occurs after a three-day period from the original airing of the program.

According to an exemplary embodiment, the receiving device requests a replacement ad from an ad manager. According to an exemplary implementation, the receiving device requests the replacement ad in real-time. For example, when a program is being played back, the receiving device requests a replacement ad. According to another exemplary implementation, the receiving device requests the replacement ad anytime the receiving device is powered on.

According to an exemplary embodiment, in response to receiving a request from the receiving device, the ad manager device selects an ad. According to an exemplary embodiment, the ad manager provides a response that indicates the selected ad to the receiving device. For example, the response may include an ad identifier to permit the receiving device to identify and play the selected ad, which may be already stored by the receiving device. Alternatively, according to an exemplary embodiment, the response may include the selected ad. Still further, according to yet another embodiment, the receiving device selects the ad. The receiving device plays the selected ad during the national ad-insertion spot.

FIG. 1 is a diagram illustrating an exemplary environment in which an exemplary embodiment of ad replacement may be implemented. As illustrated in FIG. 1, environment 100 includes network 105 and customer premises 150-1 through 150-N (also referred to collectively and individually as customer premises 150). Network 105 includes a national distribution site 110, regional distribution sites 115-1 through 115-X, in which X>1 (also referred to collectively as regional distribution sites 115 or individually as regional distribution site 115), local distribution sites 120-1 through 120-Z, in which Z>1 (also referred to collectively as local distribution sites 120 or individually as local distribution site 120), and ad manager 125. Customer premises 150 include televisions (TVs) 155-1 through 155-N, in which N>1 (also referred to collectively as televisions 155 or individually as television 155), interface devices 160-1 through 160-N, in which N>1 (also referred to collectively as interface devices 160 or interface device 160), and remote devices 165-1 through 165-N, in which N>1 (also referred to collectively as remote devices 165 or individually as remote device 165).

The number of devices and the configuration in environment 100 are exemplary and provided for simplicity. According to other embodiments, environment 100 may include additional devices, fewer devices, different devices, and/or differently arranged devices, than those illustrated in FIG. 1. For example, according to other embodiments, a single device in FIG. 1 may be implemented as multiple devices. By way of example, ad manager 125 may be implemented as multiple devices. Additionally, or alternatively, according to other embodiments, multiple devices may be implemented as a single device. By way of example, television 155 and interface device 160 may be implemented as a single device. Additionally, or alternatively, customer premises 150 may include, for example, a wireless router, a computer, and/or another type of communicative device.

Additionally, or alternatively, environment 100 may include additional networks and/or differently arranged networks than those illustrated in FIG. 1. For example, environment 100 may include other types of network(s), such as a program provider network, an ad provider network, a program provider network, the Internet, etc. Additionally, or alternatively, customer premises 150 may include a local area network (LAN).

A device may be implemented according to a centralized computing architecture, a distributed computing architecture, or a cloud computing architecture. Additionally, a device may be implemented according to one or multiple network architectures (e.g., a client device, a server device, a peer device, or a combination thereof). Also, according to other embodiments, one or more functions and/or processes described as being performed by a particular device may be performed by a different device, or some combination of devices, which may or may not include the particular device.

Environment 100 may be implemented to include wired and/or wireless connections among the devices and the network illustrated. A connection may be direct or indirect and involve intermediary device(s) and/or network(s) not illustrated in FIG. 1.

Network 105 includes one or multiple networks that distributes or makes available programs and ads. Network 105 may be implemented as a satellite-based network and/or a terrestrial-based network. According to an exemplary embodiment, network 105 may be implemented as a television distribution network. According to other embodiments, network 105 may be implemented as a mobile network, a network associated with the Internet, and/or other suitable network(s).

National distribution site 110 includes devices to distribute programs and ads to a national area. Regional distribution site 115 includes devices to distribute programs and ads to a regional area. Local distribution site 120 includes devices to distribute programs and ads to a local area. For example, national distribution site 110 may be implemented as a super headend, regional distribution site 115 may be implemented as a video hub office, and/or local distribution site 120 may be implemented as a video switching office. National distribution site 110, regional distribution site 115, and/or local distribution site 120 may include various devices, such as, for example, media servers, search servers, load balancers, databases, and transport devices (e.g., routers, switches, etc.). Alternatively, national distribution site 110, regional distribution site 115, and/or local distribution site 120 may be implemented as other types of infrastructures, which may or may not include national, regional, and/or local sites that provide, for example, program and ad acquisition (e.g., a content center), program and ad processing, and program and ad distribution.

Ad manager 125 includes a network device that manages ads to be played during a national ad-insertion spot. According to an exemplary embodiment, ad manager 125 selects an ad to replace an ad whose billable cycle has expired. For example, under the Nielson rating system, the billable cycle is three days. By way of example, ad manager 125 may be implemented as a computer or other type of computational device. Ad manager 125 is described further below. Although ad manager 125 is illustrated in FIG. 1 as residing outside of national, regional, and local distribution sites, according to other embodiments, ad manager 125 may be implemented as a network device within one or more of the distribution sites. Alternatively, ad manager 125 may not be a part of network 105. For example, ad manager 125 may be an Internet-connected server and/or platform.

Each customer premises 150 corresponds to a location where a customer receives service from network 105. For example, the customer may receive service at home, at work, or at locations where the customer is mobile. Each customer premises 150 includes one or multiple devices that allow the customer to receive programs and ads. For example, in a home setting, customer premises 150 may include television 155, interface device 160, and remote device 165. Additionally, according to other embodiments, customer premises 150 may include various devices to allow the user to receive programs via Internet service and/or mobile service, as described herein. According to another example, in a mobile setting, customer premises 150 may include a mobile device (e.g., a smartphone, a tablet device, a laptop computer, etc.). Alternatively, the user may use a vehicular communication system associated with the user's vehicle. According to yet another example, in a work setting, customer premises 150 may include a desktop computer or some other suitable user device.

Television 155 includes a device to display programs and ads. According to an exemplary implementation, television 155 may correspond to a television. Alternatively, television 155 may be implemented as other types of display devices, such as, for example, a monitor, a mobile device having a display, etc. According to an exemplary embodiment, television 155 and interface device 160 may be separate devices, as illustrated in FIG. 1. According to other embodiments, television 155 may include interface device 160 or include some of the functionalities provided by interface device 160.

Interface device 160 includes a device that communicates with network 105 to receive programs and ads. According to an exemplary implementation, interface device 160 may be implemented as a set top box. The set top box may include a client device, a thin client device, a converter box, a receiver device, a server device, a peer device, a tuner device, and/or a digibox.

According to an exemplary embodiment, interface device 160 includes a digital video recorder (DVR) and a hard drive. According to an exemplary embodiment, interface device 160 provides multi-room television services. According to an exemplary embodiment, interface device 160 replaces an ad in a national ad-insertion spot, as described herein.

Remote device 165 includes a device that communicates with television 155 and/or interface device 160 to allow a user to interact with interface device 160 and/or television 155. Remote device 165 may include one or multiple input mechanisms (e.g., buttons, a display, a touchpad, a touchscreen, a microphone, etc.) to receive a user's input and, among other things, allow the user to interact with interface device 160 and/or television 155. According to an exemplary embodiment, remote device 165 may correspond to a remote control device (e.g., a set-top box controller, a television controller, a combination thereof, etc.).

According to other embodiments, remote device 165 may correspond to other types of devices. For example, remote device 165 may be implemented as a tablet device, a mobile communication device, a personal digital assistant (PDA), a handheld device, a smartphone, or some other type of user device. According to still other embodiments, remote device 165 may include television 155. According to yet other embodiments, remote device 165 may include television 155 and interface device 160 or include some of the functionalities associated with interface device 160.

As previously described, according to an exemplary embodiment, recorded ads in national ad-insertion spots are replaced. For example, a receiving device, such as interface device 160, replaces an ad. An exemplary process for replacing a recorded ad is described below.

Figure 2A:
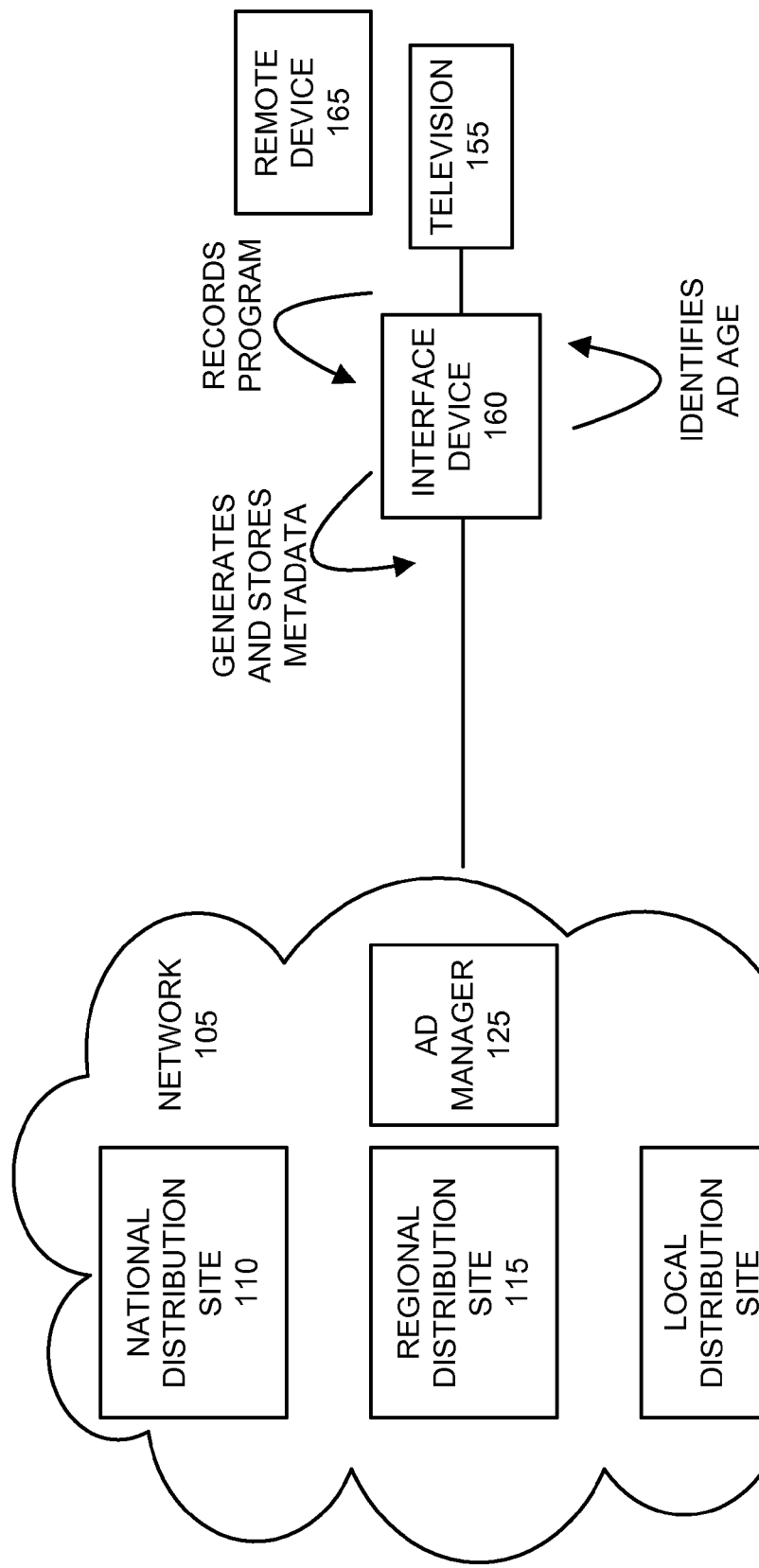
FIGS. 2A-2D are diagrams illustrating an exemplary process for replacing recorded national ads.

FIGS. 2A-2D are diagrams illustrating an exemplary process for replacing recorded national ads. Referring to FIG. 2A, assume that a user (not illustrated) records a program and a national ad, airing on a Monday evening, using interface device 160. According to an exemplary embodiment, interface device 160 identifies the presence of cue and timing information pertaining to the national ad-insertion slot during the recording. For example, the cue and timing information may be in-band data relative to a program signal received by interface device 160. The cue and timing information may also be formatted in such a way as to avert ad-skipping technologies.

According to an exemplary implementation, in response to identifying the cue and timing information, interface device 160 generates and stores metadata indicating that the recorded program file includes a national ad-insertion slot. The metadata may include other information, such as a time stamp indicating when the national ad occurs relative to the beginning of the program or the beginning of the recording. Additionally, the metadata may include the duration of the national ad-insertion slot (e.g., 60 seconds, 90 seconds, etc.).

Now assume that it is Thursday evening, and the user wishes to view the program recorded on Monday. The user initiates the playback of the recorded program via remote device 165 and interface device 160. Interface device 160 reads the metadata and determines that the recorded program includes a national ad-insertion slot. Interface device 160 also identifies the age of the recorded program including the national ad-insertion slot. For example, interface device 160 identifies a recording date and timestamp associated with the recorded program and compares that data and time with the current data and time. According to this exemplary scenario, assume that the age of the recorded program is identified as being beyond a three-day period from which the program initially aired. Interface device 160 begins to playback the recorded program, which is viewed by the user via television 155.

Figure 2B:
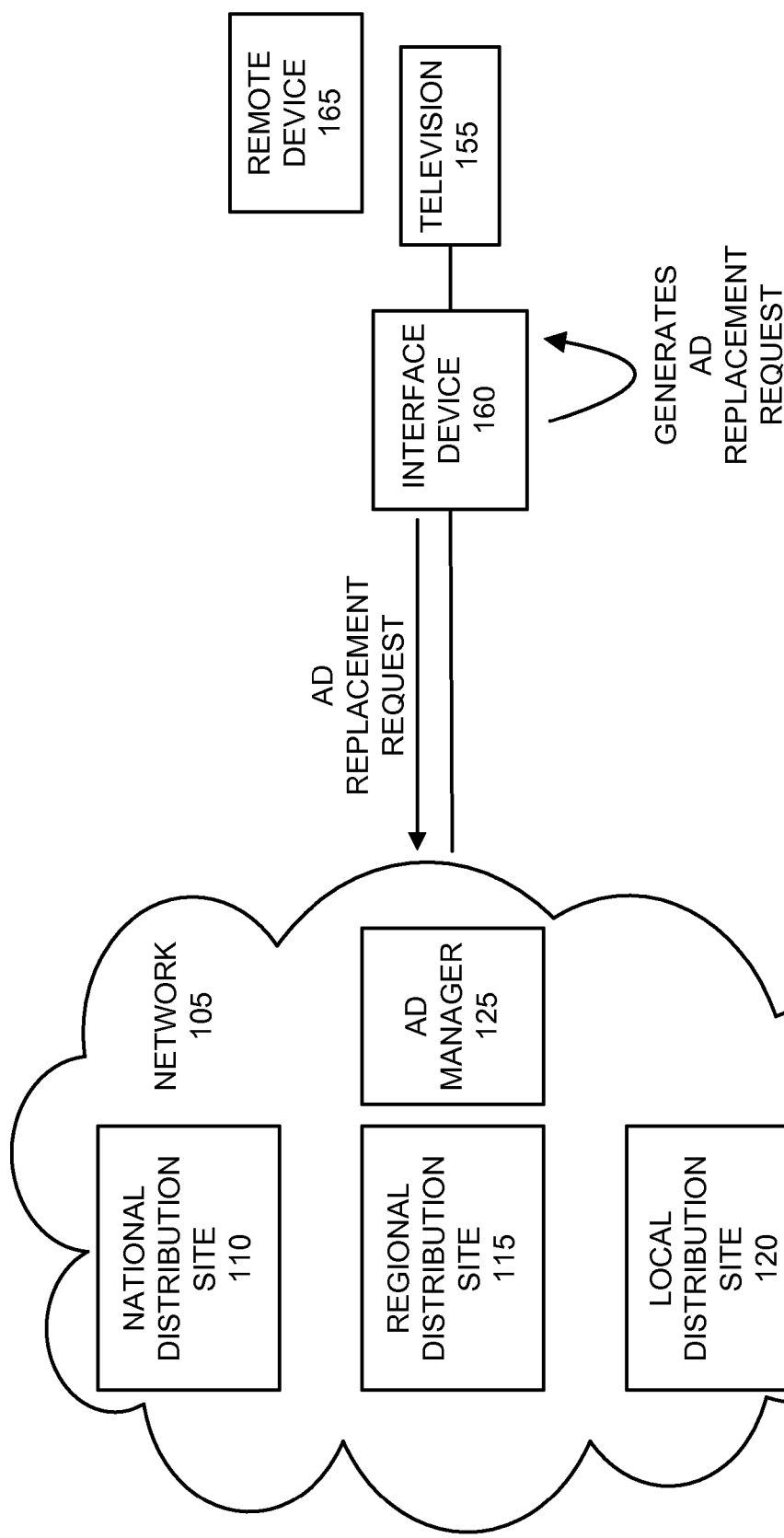

Referring to FIG. 2B, in response to identifying the age of the recorded program, interface device 160 generates an ad replacement request. The ad replacement request may include various types of information. For example, the ad replacement request may include an identifier that identifies the program and/or the recorded date and timestamp associated with the program. Interface device 160 includes timing information pertaining to the national ad-insertion slot (e.g., 60 seconds, 90 seconds, etc.) in the ad replacement request and transmits the ad replacement request to ad manager 125. According to other implementations, the ad replacement request may include additional, fewer, and/or different information or data. For example, the ad replacement request may include ad targeting information. The ad targeting information may include identifiers that identifier the user, interface device 160, a location of the user (e.g., zip code, etc.), demographics associated with the user (e.g., obtained from subscriber information), and/or other information to select a replacement ad, identifier of a replacement ad, etc., which targets the user. Additionally, or alternatively, the information included in the cue and timing information may form a basis for the information included in an ad replacement request. For example, the cue and timing information may include an ad identifier that identifies the ad, information indicating the number of ads, a length of time of the national ad-insertion spot, etc. In this regard, the information included in the ad replacement request may be based on the cue and timing information, which in turn may depend on the agreement between a service provider and, a national ad provider and/or a program provider.

Figure 2C:
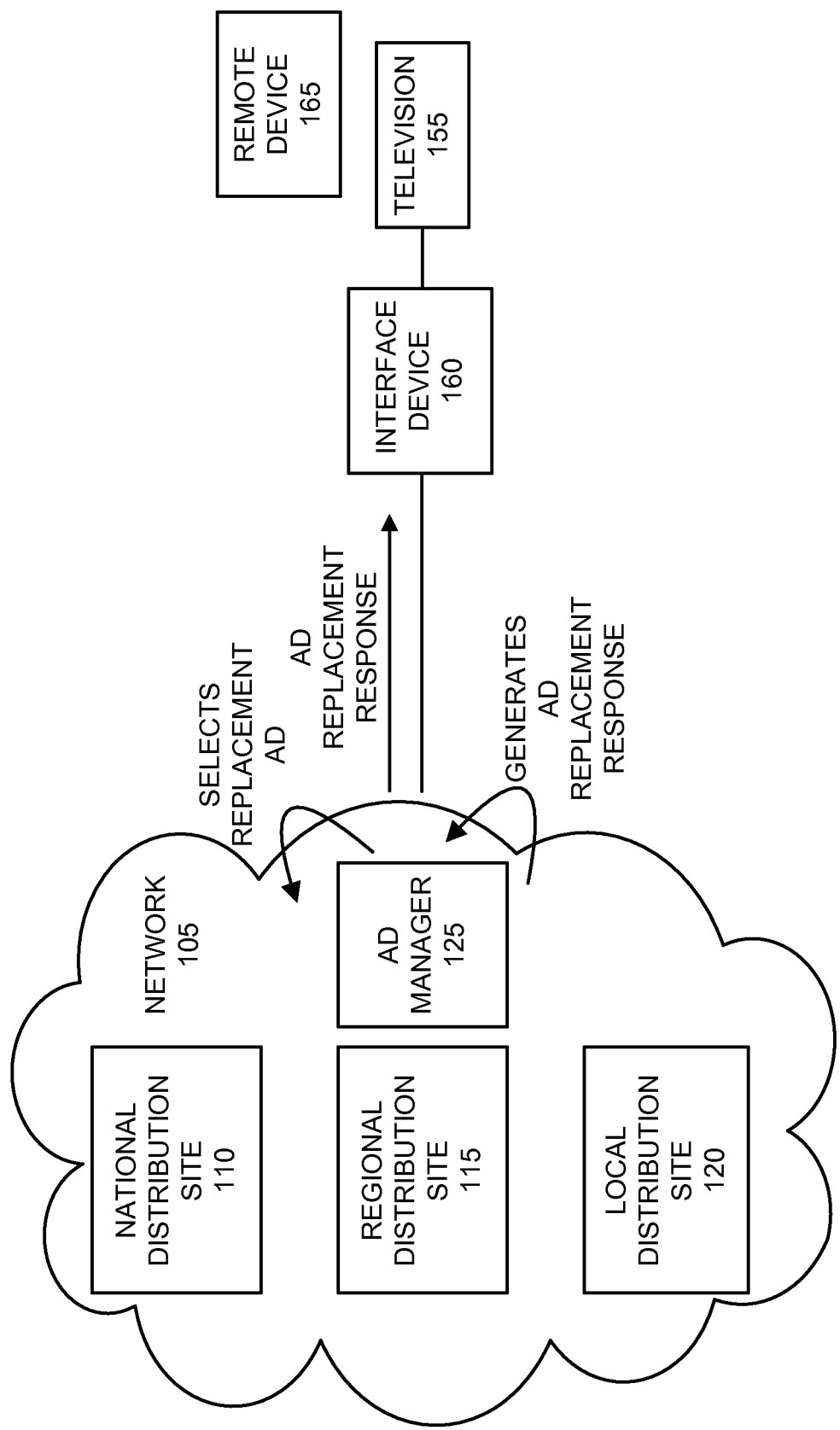

Referring to FIG. 2C, and in response to receiving the ad replacement request, ad manager 125 selects a replacement ad (e.g., a national ad) to fill the national ad-insertion spot. For example, program providers and/or national ad providers may directly or indirectly provide ad manager 125 with national ads that are to be aired on a given date, time, channel, and/or program, aired based on target information (e.g., location of user, audience demographics, etc.), a combination thereof, etc. As further illustrated in FIG. 2C, ad manager 125 generates an ad replacement response to interface device 160. For example, the ad replacement response includes the selected replacement ad. According to other implementations, the ad replacement response may include additional and/or different information or data, as described herein.

Figure 2D:
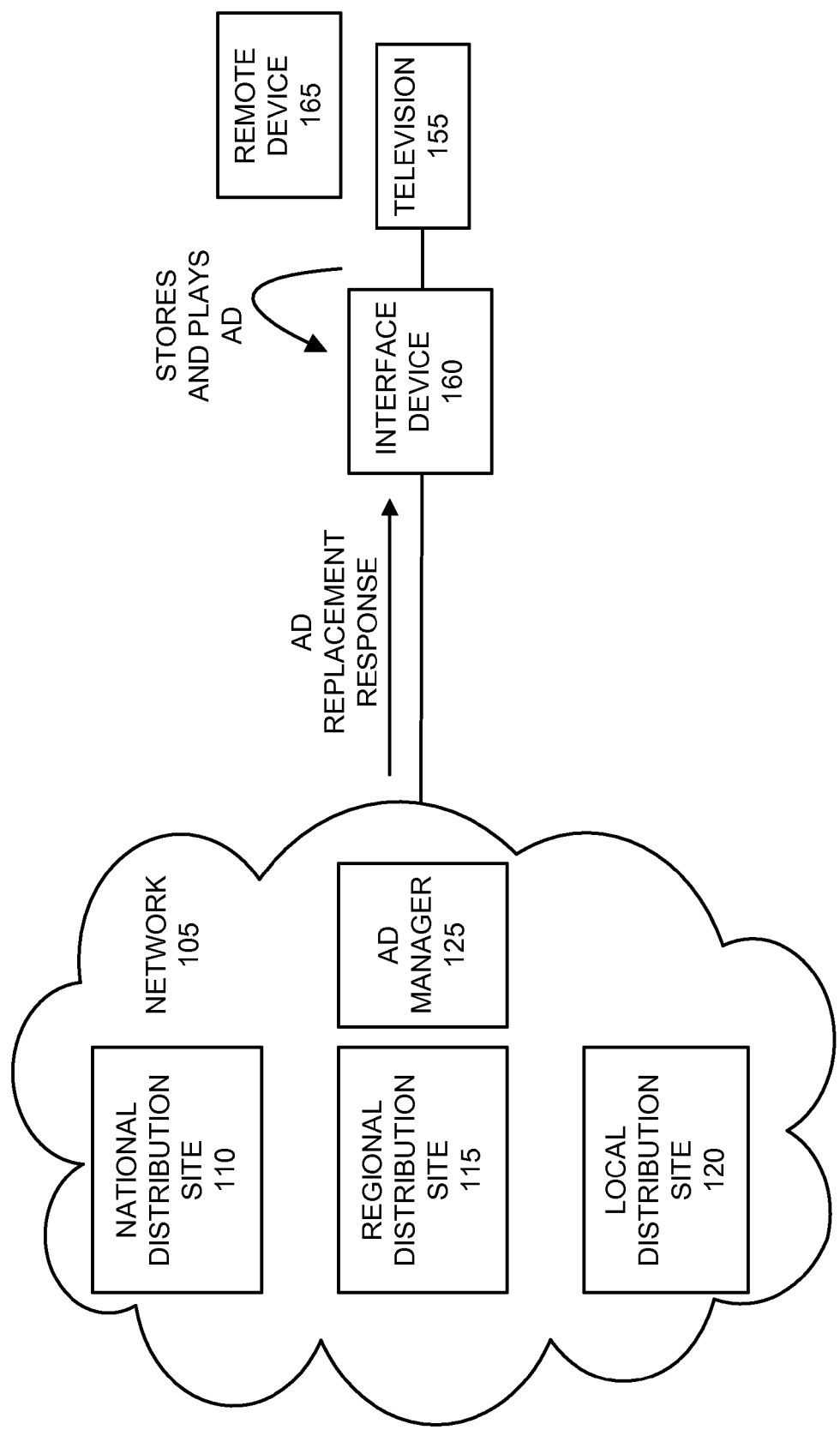

Referring to FIG. 2D, in response to receiving the ad replacement response, interface device 160 stores the selected replacement ad. During the playback of the program, interface device 160 identifies the cue and timing information pertaining to the national ad-insertion spot and plays the selected replacement ad.

As described in FIGS. 2A-2D, according to an exemplary embodiment, interface device 160 generates metadata pertaining to a national ad-insertion spot and transmits an ad replacement request when the user initiates playback of a recorded program that includes a national ad-insertion spot. According to other embodiments, a process for replacing recorded national ads may be performed differently.

According to another exemplary embodiment, interface device 160 actively updates national ad-insertion spots. For example, an update may occur regardless of whether or not a user initiates the playback of a recorded program. Interface device 160 may generate and transmit an ad replacement request anytime interface device 160 is powered on. For example, interface device 160 may monitor (e.g., continuously, periodically, etc.) the ad age associated with a recorded program including a national ad-insertion spot. Interface device 160 receives an ad replacement response that includes a replacement ad and stores the replacement ad. In some situations, such an embodiment may avoid latency issues.

According to yet another exemplary embodiment, interface device 160 requests an ad from ad manager 125. In response, ad manager 125 instructs other network devices (e.g., video-on-demand (VoD) servers, VoD inserters, etc.) to make a replacement ad available for ad replacement.

Figure 3:
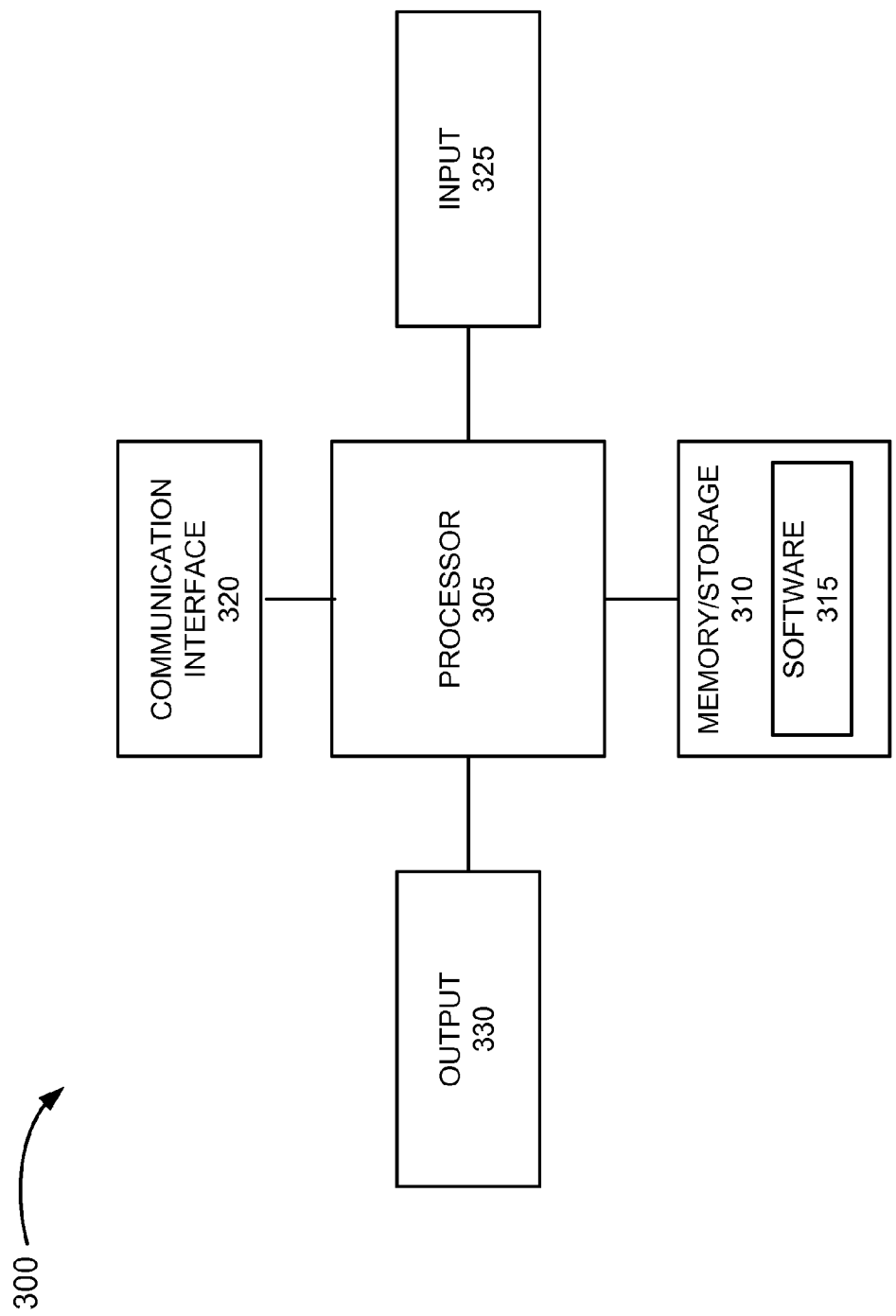
FIG. 3 is a diagram illustrating exemplary components of a device that may correspond to a device previously described.

FIG. 3 is a diagram illustrating exemplary components of a device 300 that may correspond to one or more of the devices in environment 100. As illustrated, according to an exemplary embodiment, device 300 may include a processor 305, memory/storage 310 including software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., memory/storage 310), etc.

Processor 305 may control the overall operation or a portion of operation(s) performed by device 300. Processor 305 may perform one or multiple operations based on an operating system and/or software (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a program that provides one or multiple functions or processes. For example, according to an exemplary embodiment, ad manager 125 and/or interface device 160 include(s) software 315 to provide a function(s) and/or a process(es) described herein. Software 315 may include various forms of firmware (e.g., microcode, data, machine code, etc.).

Communication interface 320 permits device 300 to communicate with other devices, networks, systems, etc. Communication interface 320 may include one or multiple wireless interfaces and/or wired interfaces. Communication interface 320 may include one or multiple transmitters, receivers, and/or transceivers. Communication interface 320 may operate according to one or multiple protocols, standards, and/or the like.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process(es) and/or a function(s), as described herein, in response to processor 305 executing instructions (e.g., software 315) stored by memory/storage 310. By way of example, instructions may be read into memory/storage 310 from another memory/storage 310 or from another device via communication interface 320. The instructions stored by memory/storage 310 may cause processor 305 to perform a process or a function, as described herein. Alternatively, for example, according to other implementations, device 300 may perform a process or a function based on the execution of hardware (processor 305, etc.), the execution of firmware with hardware, or the execution of software and firmware with hardware.

Figure 4A:
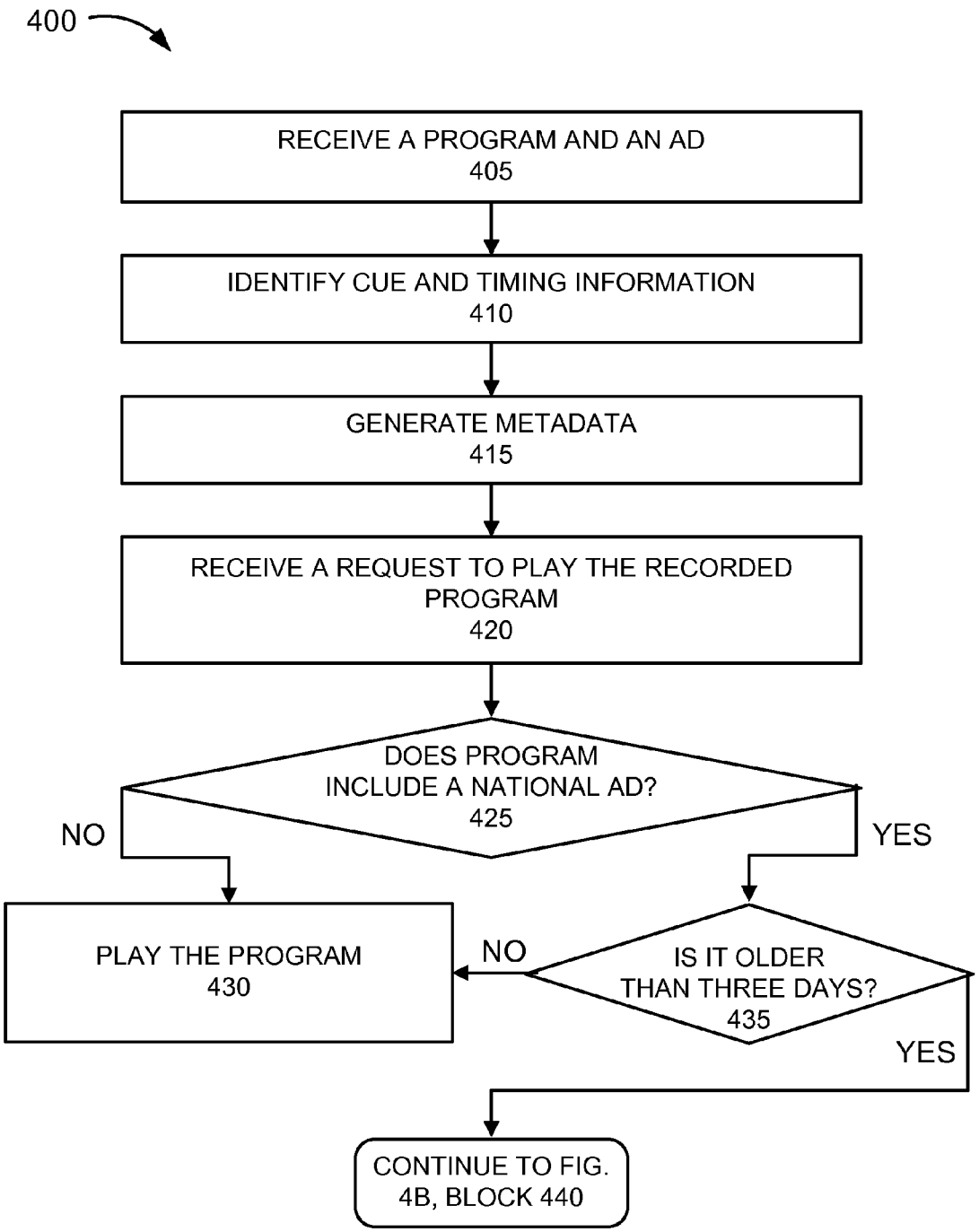
FIGS. 4A and 4B are flow diagrams illustrating an exemplary process for replacing a recorded ad.
Figure 4B:
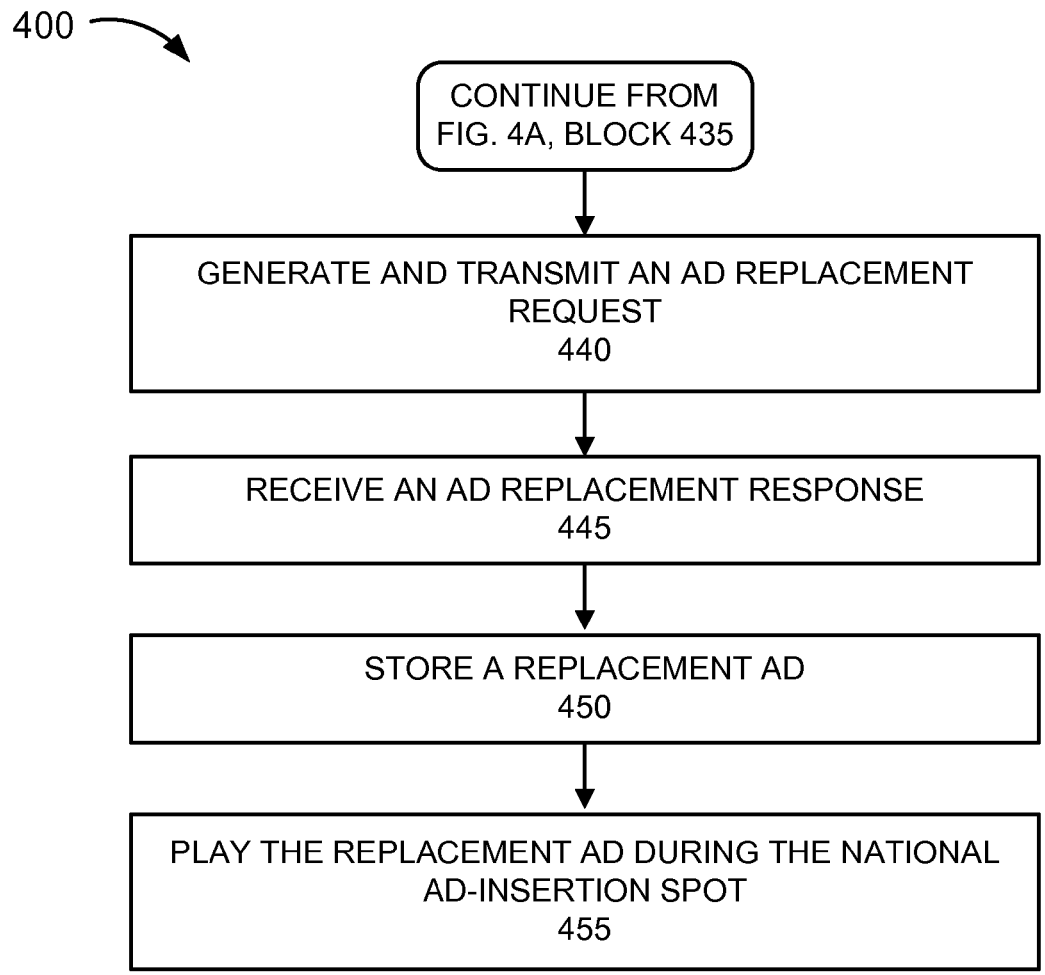

FIGS. 4A and 4B are flow diagrams illustrating an exemplary process 400 for replacing recorded ads. According to an exemplary embodiment, process 400 is performed by interface device 160. For example, processor 305 executes software 315 to perform process 400.

Referring to FIG. 4A, block 405, process 400 begins with a program and an ad being received. For example, as previously described, interface device 160 receives a program that includes a national ad from network 105. The program includes cue and timing information pertaining to a national ad-insertion spot.

In block 410, cue and timing information is identified. For example, as previously described, interface device 160 records the program. During the recording of the program, interface device 160 identifies cue and timing information.

In block 415, metadata is generated. For example, as previously described, in response to identifying the cue and timing information, interface device 160 generates metadata. The metadata includes an indication that the program includes a national ad-insertion spot. The metadata may include additional information, as previously described, such as the length of the national ad-insertion spot, the time the national ad-insertion spot occurs, etc. Interface device 160 continues and completes the recording of the program.

In block 420, a request to play the recorded program is received. For example, as previously described, interface device 160 receives a user request to play the recorded program.

In block 425, the metadata is read. For example, as previously described, interface device 160 reads metadata associated with the program. According to this example, it is assumed that metadata exists pertaining to the program. According to other situations, there may not be metadata associated with a program. In this regard, process 400 may include interface device 160 determining whether metadata exists.

In block 425, it is determined whether the program includes a national ad. For example, as previously described, interface device 160 determines whether metadata associated with the recorded program exists.

If it is determined that the program does not include a national ad (block 425—NO), then the program is played (block 430). For example, interface device 160 plays (or continues to play) the recorded program.

If it is determined that the program does include a national ad (block 425—YES), then it is determined whether the national ad is older than three days (block 435). For example, interface device 160 identifies a date and a timestamp, which indicates a date and a time the program and the national ad was recorded, with the current date and time of playback. Based on this comparison, interface device 160 determines the age of the national ad. Interface device 160 compares the age of the national ad with a threshold time period (e.g., three days).

If it is determined that the program is not older than three days (block 435—NO), then the program is played (block 430). For example, interface device 160 plays (or continues to play) the recorded program.

If it is determined that the program is older than three days (block 435—YES), then an ad replacement request is generated and transmitted (block 440), as illustrated in FIG. 4B. For example, as previously described, interface device 160 generates and transmits an ad replacement request to ad manager 125. The ad replacement request includes information indicating the length of the national ad-insertion spot. The ad replacement request may include other information relevant to selecting a replacement ad, as previously described.

In block 445, an ad replacement response is received. For example, as previously described, interface device 160 receives an ad replacement response. The ad replacement response includes a replacement ad.

In block 450, the replacement ad is stored. For example, as previously described, interface device 160 stores the replacement ad.

In block 455, the replacement ad is played during the national ad-insertion spot. For example, as previously described, during playback of the program, interface device 160 identifies the cue and timing information pertaining to the national ad-insertion spot. At such time, interface device 160 plays the replacement ad.

Although FIGS. 4A and 4B illustrate an exemplary process 400 for replacing recorded ads, according to other embodiments, process 400 may include additional operations, fewer operations, and/or different operations than those described and illustrated in FIGS. 4A and 4B. For example, interface device 160 may monitor the ad age associated with a program and proactively obtain a replacement ad when the ad age is beyond a threshold time period (e.g., three days or some other time period). This may occur regardless of whether a user initiates the playback of the program. Additionally, or alternatively, according to an exemplary embodiment, interface device 160 may receive a multitude of replacement ads (e.g., more ads than are needed to fill a national ad-insertion spot) and interface device 160 may select a replacement ad based on various criteria. For example, interface device 160 may select a replacement ad based on the content of the replacement ad relative to, for example, the day (e.g., during the work week, weekend, Monday, etc.) and/or time of the program playback, the content of the program (e.g., genre and/or sub-genre of the program, etc.), and/or other types of criteria (e.g., ad targeting information, etc.).

According to yet another embodiment, interface device 160 may not identify cue and timing information and generate metadata when the program and the ad are being received. Rather, for example, interface device 160 may identify cue and timing information pertaining to a national ad-insertion spot during the playback of the program. At such time, interface device 160 generates an ad replacement request to ad manager 125. In this way, the request, the response and the playback of a replacement ad occurs in real-time. Additionally, depending on how the cue and timing information is provisioned within the program, interface device 160 may identify necessary information to replace an ad with minimal latency. For example, national ad providers and/or program providers may place cue and timing information and/or other indicating information at a time well-before the occurrence of the national ad spot (e.g., at the beginning of the program, a few minutes before the national ad spot, etc.) to allow interface device 160 sufficient time to obtain, select, and/or play a replacement ad.

According to yet other embodiments, the replacement ad response may include a location (e.g., a link, a network address, etc.) from which interface device 160 may obtain or retrieve a replacement ad. The device that stores the replacement ad may reside inside or outside of network 105.

According to still other embodiments, interface device 160 may replace ads based on an on-line version of the program. For example, a service provider may offer users access to programs on-line (e.g., via a web site). This version of the program may include fewer ads and/or less time dedicated to ads than the originally aired version (e.g., the recorded version). According to an exemplary embodiment, interface device 160 generates and transmits a request to ad manager 160 or other network device. Interface device 160 receives a response that includes the ads or the locale of the ads used for the on-line version. Interface device 160 plays the replacement ads, if any, during playback of the recorded program. According to an exemplary embodiment, interface device 160 includes ad-skipping logic. For example, interface device 160 uses ad-skipping logic to reduce the number of ads and/or the length of ad time in correspondence to the on-line version of the program and ads.

Figure 5:
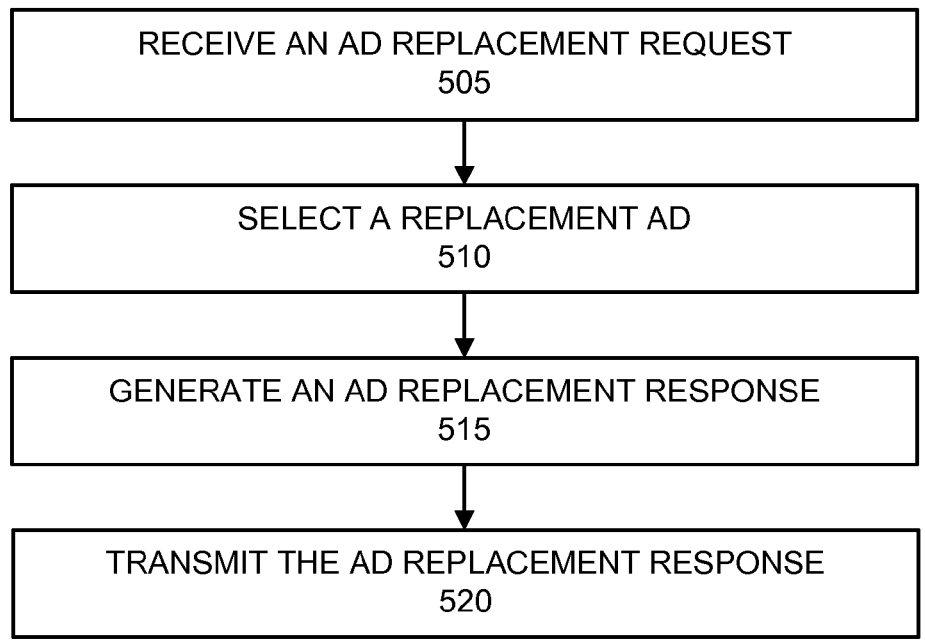
FIG. 5 is a flow diagram illustrating another exemplary process for replacing a recorded ad.

FIG. 5 is a flow diagram illustrating an exemplary process 500 for replacing recorded ads. According to an exemplary embodiment, process 500 is performed by ad manager 125. For example, processor 305 executes software 315 to perform process 500.

Referring to FIG. 5, block 505, process 500 begins with an ad replacement request being received. For example, as previously described, ad manager 125 receives an ad replacement request from interface device 160. The ad replacement request pertains to replacing a national ad associated with a recorded program.

In block 510, a replacement ad is selected. For example, as previously described, For example, as previously described, ad manager 125 selects a replacement ad based on national ads that are being aired on a given date, time, channel, program, location of user, combination thereof, audience demographic, etc.

In block 515, an ad replacement response is generated. For example, as previously described, ad manager 125 generates an ad replacement response that includes the selected replacement ad.

In block 520, the ad replacement response is transmitted. For example, as previously described, ad manager 125 transmits the ad replacement response to interface device 160. According to an exemplary implementation, the ad replacement response includes the selected ad. According to other exemplary implementations, the ad replacement response may include an national ad identifier (e.g., if interface device 160 already stores a national ad) and/or other information to permit interface device 160 to play an appropriate replacement national ad.

Although FIG. 5 illustrates an exemplary process 500 for replacing recorded ads, according to other embodiments, process 500 may include additional operations, fewer operations, and/or different operations than those described and illustrated in FIG. 5.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4A, 4B, and 5, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 305, etc.), a combination of hardware and software (e.g., software 315), a combination of hardware and firmware, or a combination of hardware, firmware, and software. The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 310.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

The invention claimed is:

1. A method comprising:
   receiving, by a user device, a program and a national ad, wherein the program includes cue and timing information that indicates a national ad-insertion spot;
   generating, by the user device, metadata indicating that the program includes the national ad-insertion spot in response to receiving the cue and timing information;
   storing, by the user device, the metadata associated with the program in response to the generating;
   recording, by the user device, the program and the national ad as the program and the national ad are being received;
   receiving, by the user device, a request to playback the program;
   identifying, by the user device, an age of the national ad based on a date and a time included in the metadata and a date and a time associated with the request;
   comparing, by the user device, the age of the national ad to a threshold time period, wherein the threshold time period is a time period during which a national ad-insertion spot is billable;
   obtaining, by the user device, a replacement national ad in response to a result of the comparing indicating that the age of the national ad exceeds the threshold time period; and
   playing, by the user device, the replacement national ad at a time when the national ad is to be played.

2. The method of claim 1, further comprising:
   identifying that the program includes the national ad-insertion spot based on the metadata and in response to receiving the request.

3. The method of claim 1, wherein the metadata indicates a length of the national ad insertion spot and a time period within the program that the national ad-insertion spot occurs.

4. The method of claim 1, further comprising:
   generating an ad replacement request in response to the result of the comparing indicating that the age of the national ad exceeds the threshold time period, wherein the threshold time period is three days from an airing of the program.

5. The method of claim 1, further comprising:
   recognizing the cue and timing information included in the program, and
   determining, in response to receiving the request, whether the program includes the national ad.

6. The method of claim 1, further comprising:
   not obtaining the replacement national ad in response to a result of the comparing indicating that the age of the national ad does not exceed the threshold time period.

7. A device comprising:
   a communication interface;
   one or more memories that store instructions; and
   one or more processors to execute the instructions to:
      receive, via the communication interface, an airing of a program and a national ad, wherein the program includes cue and timing information indicating a national ad-insertion spot;
      generate metadata indicating that the program includes the national ad-insertion spot in response to a receipt of the cue and timing information;
      store the metadata in response to a generation of the metadata;
      record the program and the national ad as the program and the national ad is being received;

identify an age of the national ad based on a date and a time included in the metadata and a current date and a current time;

obtain a replacement national ad in response to an identification that the age of the national ad exceeds a threshold time period, wherein the threshold time period is a time period during which a national ad-insertion spot is billable; and play the replacement national ad at a time when the national ad is to be played during a playback of the recorded program.

8. The device of claim 7, wherein the one or more processors further execute the instructions to:

generate an ad replacement request;

transmit, via the communication interface, the ad replacement request to another device; and receive, via the communication interface, an ad replacement response that includes the replacement national ad.

9. The device of claim 7, wherein the one or more processors further execute the instructions to:

receive a request to playback the program, and wherein when identifying the age of the national ad, the one or more processors further execute the instructions to:

identify the age of the national ad in response to a receipt of the request.

10. The device of claim 7, wherein the one or more processors further execute the instructions to:

recognize the cue and timing information included in the program.

11. The device of claim 7, wherein the device includes a set top box, and wherein the time period during which the national ad-insertion spot is billable is based on a Nielson rating system.

12. A non-transitory storage medium storing instructions executable by a device to:

receive an airing of a program and a national ad, wherein the program includes cue and timing information pertaining to the national ad and the cue and timing information indicates a national ad-insertion spot;

generate metadata indicating that the program includes the national ad-insertion spot in response to a receipt of the cue and timing information;

store the metadata in response to a generation of the metadata;

record the program and the national ad;

identify an age of the national ad based on the metadata;

compare the age of the national ad relative to a threshold time period, wherein the threshold time period is a time period during which a national ad-insertion spot is billable; and obtain a replacement national ad in response to a result of a comparison indicating that the age of the national ad exceeds the threshold time period.

13. The non-transitory storage medium of claim 12, further storing instructions executable by the device to:

recognize the cue and timing information included in the program, wherein the cue and timing information is in-band.

14. The non-transitory storage medium of claim 12, further storing instructions executable by the device to:

receive a request to playback the program;

use the metadata to identify whether the program includes a national ad; and generate a replacement ad request in response to a result of a comparison indicating that the age of the national ad exceeds the threshold time period.

15. The non-transitory storage medium of claim 12, further storing instructions executable by the device to:

compare a date and a timestamp, which is included in the metadata, associated with the recorded program to a current date and a current time;

identify the age of the national ad based on a result of a comparison between the date and the timestamp associated with the recorded program and the current date and the current time; and play the replacement national ad at a time when the national ad is to be played during a playback of the recorded program.

16. The device of claim 7, wherein the one or more processors further execute the instructions to:

identify that the program includes the national ad-insertion spot based on the metadata.

17. The device of claim 7, wherein the one or more processors further execute the instructions to:

receive a request to playback the program; and not obtain the replacement national ad in response to a determination indicating that the age of the national ad does not exceed the threshold time period.

18. The non-transitory storage medium of claim 12, further storing instructions executable by the device to:

generate an ad replacement request in response to a result of a comparison indicating that the age of the national ad exceeds the threshold time period, wherein the threshold time period is three days from the airing of the program.

19. The non-transitory storage medium of claim 12, wherein the metadata indicates a length of the national ad insertion spot and a time period within the program that the national ad-insertion spot occurs.

20. The non-transitory storage medium of claim 12, further storing instructions executable by the device to:

not obtain the replacement national ad in response to a result of the comparison indicating that the age of the national ad does not exceed the threshold time period.

* * * * *